United States Patent [19]
Dielacher et al.

[11] Patent Number: 5,271,059
[45] Date of Patent: Dec. 14, 1993

[54] METHOD AND CONFIGURATION FOR FORMING A LINE TERMINATION OF A TELEPHONE LINE

[75] Inventors: Franz Dielacher; Gerald Wallnberger, both of Villach; Karl Formanek, Vienna, all of Austria

[73] Assignee: Siemens Aktiengesellschaft, Munich, Fed. Rep. of Germany

[21] Appl. No.: 647,577

[22] Filed: Jan. 29, 1991

[30] Foreign Application Priority Data

Jan. 29, 1990 [EP] European Pat. Off. ......... 90101719.4

[51] Int. Cl.$^5$ .......................................... H04M 9/08
[52] U.S. Cl. .................................. 379/398; 379/399; 379/394
[58] Field of Search ............... 379/398, 399, 387, 400, 379/394, 395

[56] References Cited

U.S. PATENT DOCUMENTS

| | | | |
|---|---|---|---|
| 4,004,102 | 1/1977 | Ott | 379/398 |
| 4,503,289 | 3/1985 | Spires | 379/398 X |
| 4,723,278 | 2/1988 | Nishio et al. | 379/394 |
| 4,961,219 | 10/1990 | Patel | 379/398 |
| 5,020,102 | 5/1991 | Schorr | 379/399 |

FOREIGN PATENT DOCUMENTS

| | | |
|---|---|---|
| 154366 | 9/1985 | European Pat. Off. |
| 263416 | 4/1988 | European Pat. Off. |
| 271946 | 6/1988 | European Pat. Off. |

Primary Examiner—James L. Dwyer
Assistant Examiner—M. Shehata
Attorney, Agent, or Firm—Herbert L. Lerner; Laurence A. Greenberg

[57] ABSTRACT

In a method and configuration for forming a line termination at two line terminals of a telephone line, alternating signals are separated from direct signals applied to line terminals, referred to a reference variable and added to a transmission signal from a transmission terminal to form a resultant actual-value signal. The resultant actual-value signal is compared with a reference signal at a gain-controlled amplifier. The reference signal is formed with an impedance transmission function corresponding to a given termination impedance by weighting the alternating signal at one of the line terminals being connected to a current sensor resistor. A current between the line terminals is determined with a control transistor associated with the current sensor resistor. The control transistor is controlled with the gain-controlled amplifier.

11 Claims, 4 Drawing Sheets

METHOD AND CONFIGURATION FOR FORMING A LINE TERMINATION OF A TELEPHONE LINE

The invention relates to a method for forming a line termination at two line terminals of a telephone line and a configuration for performing the method.

Each telephone in a telephone system is connected to a telephone line through two line terminals, so that it receives line signals composed of direct and alternating signals over the telephone line, through switching performed by the central telephone exchange. The direct signals serve to generate a direct-signal characteristic curve that is required for operating the system, and the alternating signals form a reception signal. The direct signals are also modulated with a transmission signal, which is generated with the aid of the telephone and transmitted over the telephone line. In order to assure optimal transmission conditions, the telephone line must be terminated with a predetermined impedance. A resistance on the order of magnitude of 600 Ω is typically provided.

Published European Application No. 0 154 366 A1 discloses a configuration that stabilizes the direct-signal variables by means of a closed-loop control circuit. Since a termination resistor, which is equal to the alternating-signal internal resistance of the speech circuit configuration, is not located in the control circuit of the configuration, a voltage drop occurs at this resistor, which impairs the typically necessary voltage supply to external components of the speech circuit.

Published European Application No. 0 263 416 A1, corresponding to U.S. Pat. No. 4,847,898, discloses an electronic speech circuit configuration that requires merely a current feeler resistor for the line current, but at the same time enables direct-signal regulation, or closed-loop control, and achieves the necessary line termination impedance by means of active switch elements, with the aid of a bridge circuit. Adaptation to the telephone line can be accomplished by replacing external components of the integrated bridge circuit.

As the scale of integration increases, and in order to increase reliability and simplify operation, it is desirable to use methods and configurations that make do with the fewest possible external components and economize on expensive repeating coils.

It is accordingly an object of the invention to provide a method and a configuration for forming a line termination of a telephone line, which overcome the hereinafore-mentioned disadvantages of the heretofore-known methods and devices of this general type and to disclose a further possibility of forming the line termination at two line terminals of a telephone line.

With the foregoing and other objects in view there is provided, in accordance with the invention, a method for forming a line termination at two line terminals of a telephone line, which comprises separating alternating signals from direct signals applied to line terminals, referring the alternating signals to a reference variable, adding the alternating signals to a transmission signal from a transmission terminal to form a resultant actual-value signal; comparing the resultant actual-value signal with a reference signal at a gain-controlled amplifier, forming the reference signal with an impedance transmission function corresponding to a given termination impedance by weighting the alternating signal at one of the line terminals being connected to a current sensor resistor; determining a current between the line terminals with a control transistor associated with the current sensor resistor, and controlling the control transistor with the gain-controlled amplifier.

In accordance with another mode of the invention, there is provided a method which comprises comparing the alternating signals at the line terminals being referred to the reference variable with a signal formed by weighting the transmission signal with an adaptation transmission function resulting from the impedance ratio between the telephone line and the line termination.

In accordance with a further mode of the invention, there is provided a method which comprises amplifying the direct signals of the line terminals being separated from the alternating signals to the actual-value signal, weighting the direct signals with a direct-signal characteristic curve transmission function, and adding the amplified and weighted direct signals to the reference signal.

With the objects of the invention in view, there is also provided a configuration for forming a line termination at two line terminals of a telephone line, comprising first and second means each being connected downstream of a respective of the line terminals for separating alternating signals from direct signals applied to the line terminals; subtraction means connected to the separating means for referring both of the alternating signals to a reference variable, a transmission terminal for issuing a transmission signal, means connected to the subtraction means and to the transmission terminal for adding both of the alternating signals to the transmission signal and forming a resultant actual-value signal, a current sensor resistor connected one of the line terminals, an impedance transmission network connected to the one line terminal for weighting the alternating signal of the one line terminal to form a reference signal, a gain-controlled amplifier having a first input connected to the adding means for receiving the resultant actual-value signal and a second input connected to the impedance transmission network for receiving the reference signal; and a control transistor being connected to the current sensor resistor between the two line terminals and having a control input connected to the gain-controlled amplifier.

In accordance with another feature of the invention, there is provided an adaptation transmission network connected to the transmission terminal for forming and weighting another signal from the transmission signal, another subtractor having an input and an output, the inputs of the other subtractor being connected to the adaptation transmission network and to the subtraction means for subtracting the other signal from the alternating signals being referred to the reference variable, and a reception terminal connected to the output of the other subtractor.

In accordance with a further feature of the invention, the adaptation transmission network achieves a constant transmission function of $\frac{1}{2}$ if the impedances of the telephone line and of the configuration match.

In accordance with an added feature of the invention, the adding means are a first adder, and there are provided means connected between the first separating means and the first adder for amplifying and adding direct signals separated from the alternating signals to the actual-value signal, a direct-signal characteristic curve transmission network connected to the second separating means for weighting direct signals, and a second adder connected between the direct-signal characteristic curve transmission network, the impedance transmission network and the gain-controlled amplifier for adding direct signals to the reference signal.

In accordance with an additional feature of the invention, the direct-signal characteristic curve transmission network includes a comparator having an input side, a direct-signal source connected to the input side of the comparator, and an amplifier connected between the input side of the comparator and the second separating means.

In accordance with yet another feature of the invention, the impedance transmission network, the adaptation transmission network and the direct-signal characteristic curve transmission network have adjustable elements determining transmission functions In accordance with a concomitant feature of the invention, the configuration is at least partly constructed as an integrated circuit with active elements.

An advantage of the invention is that the alternating signals are included in the closed-loop control and thus the line termination impedance can be achieved extremely precisely. Further closed-loop control for the direct signals which can also be provided, is decoupled from the closed-loop control of the alternating signals. The invention makes a two-wire/four-wire conversion possible with electronic means. In principle, the invention can also be constructed on a single chip. Finally, an adaptation to the telephone line is possible by providing that the transmission networks used are adjustable or programmable.

Other features which are considered as characteristic for the invention are set forth in the appended claims.

Although the invention is illustrated and described herein as embodied in a method and a configuration for forming a line termination of a telephone line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
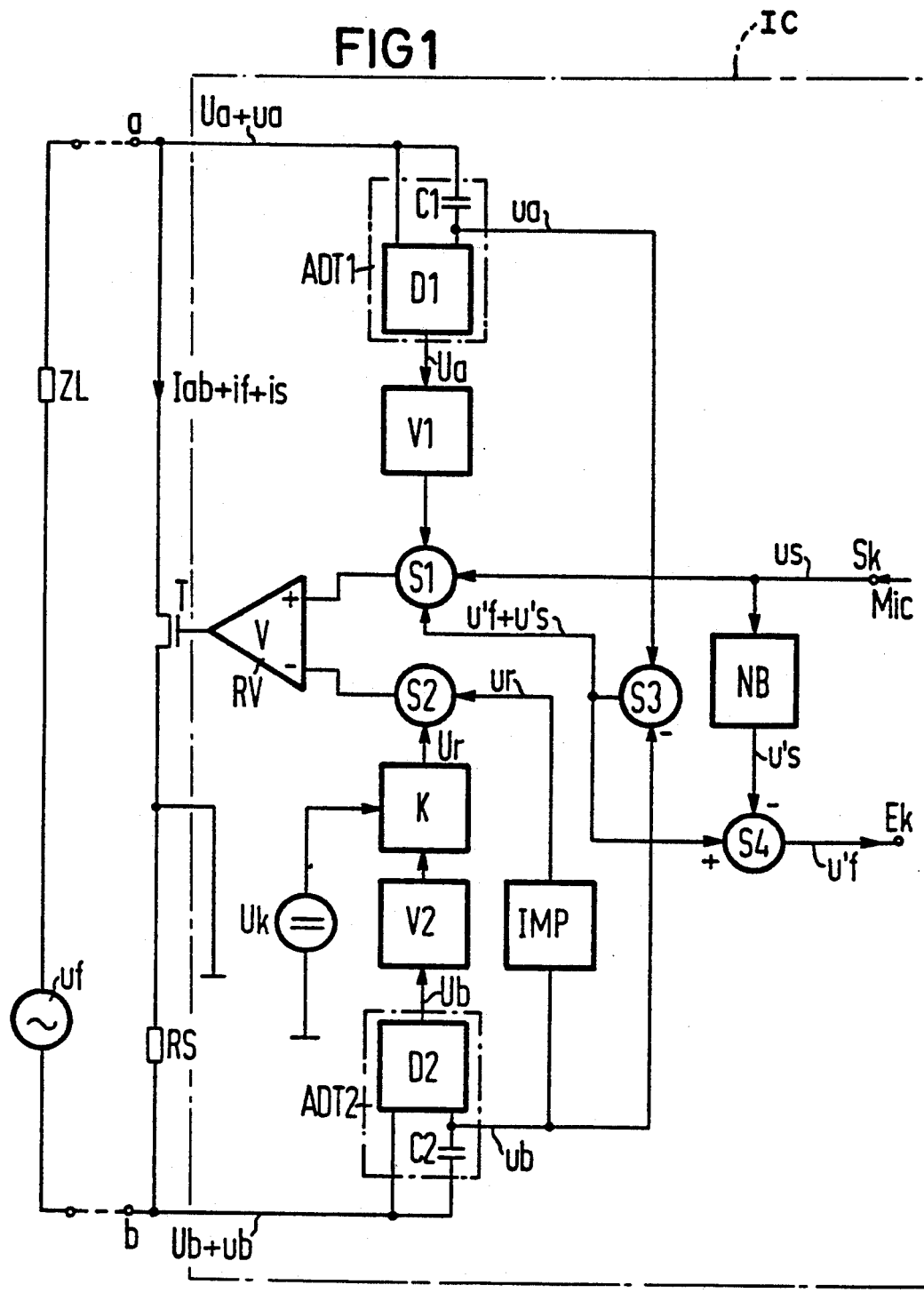
FIG. 1 is a basic schematic and block circuit diagram of a configuration according to the invention with regulated, i.e., closed-loop controlled termination impedance, regulated direct-signal characteristic curve, and two-wire/four-wire conversion.

Referring now to the figures of the drawing in detail and first, particularly, to FIG. 1 thereof, there is seen a configuration according to the invention that can be connected through line terminals "a" and "b" to a telephone line, which has a line resistance ZL and is fed from a telephone exchange with a signal uf from a remote caller. The configuration according to the invention includes a gain-controlled amplifier RV, which supplies a control transistor T. The output side of the control transistor T is connected between the line terminals a and b to an associated current sensor resistor RS. The connecting point of the control transistor T to the current sensor resistor RS is connected to ground potential. A direct current Iab determined by the telephone exchange and flowing through the control transistor T and the current sensor resistor RS as a function of the direct-signal characteristic curve, an alternating current "if" corresponding to the signal of the remote caller, and a current "is" corresponding to the signal of the transmitter, generate direct voltage signals Ua and Ub and alternating voltage signals ua and ub at the respective terminals a and b.

The direct and alternating signals applied to the terminals are separated from one another with the aid of first and second function blocks ADT1 and ADT2. Decoupling capacitors C1 and C2 serve to decouple the alternating signals from the direct signals. High-pass filters which can also be used for decoupling, may be constructed as active integrable filters by continuous time technology, for instance. For instance, 100 Hz is adequate as a limit frequency. Firstly, the signals at the terminals a and b and secondly, the signals with the alternating voltages ua and ub, are present at inputs of respective subsequent subtractors or differential amplifiers D1 and D2, while the direct voltage signals Ua and Ub are present at outputs thereof. The direct voltage signal Ua is amplified in an amplifier V1 and connected through a first adder S1 to the non-inverting, positive or first input of the amplifier RV. The direct voltage signal Ub is amplified in the amplifier V2 and compared with a trip or kink voltage Uk in a comparator K. A signal Ur at the output of the comparator K is applied through a second adder S2 to the inverting or second input of the gain-controlled amplifier RV, and is compared with the direct signal at the non-inverting input of the gain-controlled amplifier. The direct signal Ur is thus created by weighting of the direct signal Ub with a direct-signal characteristic curve transmission function formed by the element V2, the voltage Uk and the comparator.

On one hand, the signal with the alternating voltage signal ub at the terminal b is weighted with an impedance transmission function with the aid of an impedance transmission network IMP, resulting in a reference signal ur which is likewise applied through the adder S2 to the inverting input of the gain-controlled amplifier and serves as a comparison signal. On the other hand, the signal with the alternating voltage signal ub is subtracted from the alternating signal ua in a subtractor S3. Thus the alternating voltage of the a/b line terminals is carried to ground potential at the output of the subtractor S3. This subtraction is necessary, since all of the voltages in the configuration are carried to ground potential. On one hand, the output signal of the subtractor S3 is likewise connected to the non-inverting input of the gain-controlled amplifier RV through the adder S1 and on the other hand it is connected to another subtractor S4. A transmission signal us that can be fed to a transmission terminal Sk, for instance through a microphone Mic, is likewise applied through the adder S1 to the non-inverting input of the gain-controlled amplifier RV and is also weighted with an adaptation transmission function through the use of an adaptation network NB. The output of the network NB carries another alternating voltage signal u's, which is subtracted from the output signal of the subtractor S3 in the other subtractor S4. The output of the other subtractor S4 is connected to a reception terminal Ek, at which a reception signal u'f is applied. The resultant signal at the output of subtractor S3, which is referred to ground potential, is u'f plus u's.

In principle, all of the elements of the basic circuit diagram of the configuration located between the terminals a and b can be integrated on one chip. The current sensor resistor RS serves to measure the direct and alternating current flowing through the terminals a and b and should be as accurate as possible. If calibration is impossible or if it is only possible with great difficulty because of the integration technique, then a discrete current sensor resistor is used. Since voltage peaks of up to 200 V and currents higher than 100 mA can occur at the terminals a and b, the control transistor T must be a power transistor. In specialized technologies, the power transistor may be integrated and otherwise, a discrete type, for instance a SIPMOS, is selected. Decoupling capacitors with large capacitances are practically unintegrable. Active high-pass filters with a suitably low limit frequency are preferably used for an integrated decoupling. The control transistor T is controlled by the gain-controlled amplifier RV in such a way that a predetermined termination impedance and direct-signal characteristic curve occur at the line terminals. The circuit simultaneously enables two-wire/four-wire conversion.

Figure 2:
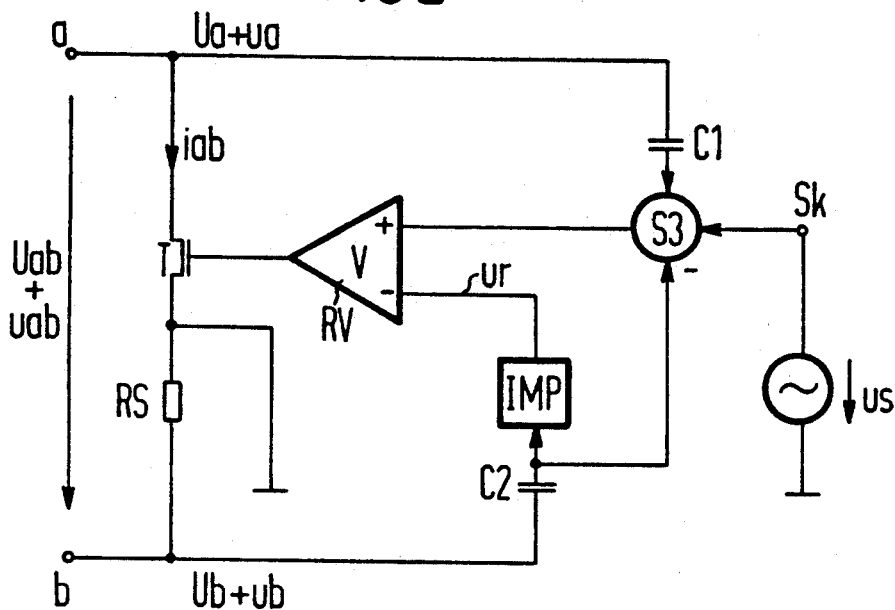
FIG. 2 is a basic circuit diagram of an alternating-signal configuration which is regulated according to the invention.

The function of the line termination configuration shown in FIG. 1 will be described below in conjunction with the following detailed basic circuit diagram. FIG. 2 illustrates the principle of the method according to the invention in the closed-loop control circuit provided for the alternating signals. The gain-controlled amplifier RV controls the control transistor T with its associated current sensor resistor RS, with these elements being located between the terminals a and b and carrying an alternating current iab. The voltage between the terminals a and b is composed of a direct voltage signal Uab and an alternating voltage signal uab. The alternating voltages at the line terminals a and b are separated from the direct voltages located at the line terminals with the aid of the coupling capacitors C1 and C2, they are carried to ground potential at the adder S3, and they are added to produce the transmission signal us at the transmission terminal Sk. The output signal of the adder S3 is applied to the non-inverting input of the gain-controlled amplifier RV. The alternating current iab is converted at the current sensor resistor RS into the voltage signal ub, which is weighted with the impedance transmission function in the network IMP and is applied as a signal having a reference voltage ur to the inverting input of the gain-controlled amplifier RV.

The gain-controlled amplifier RV, which has a gain V, with the aid of the control transistor T, which has a slope gmT, corrects the output voltage of the adder S3 present at the non-inverting input of the gain-controlled amplifier to the reference voltage ur, so that the line terminals a and b are terminated with the predetermined impedance determined by the impedance transmission function of the network IMP.

Figure 3A:
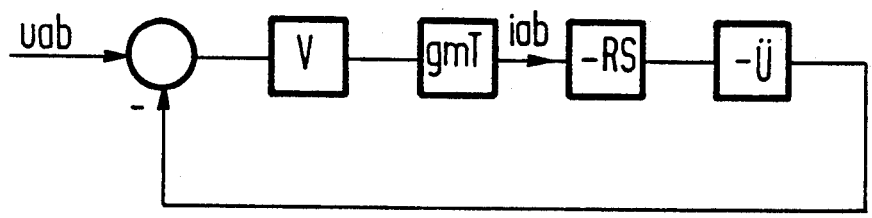
FIG. 3a is a basic closed-loop control circuit diagram for reception signal control.

The alternating-signal control behavior of the configuration according to the invention as shown in FIGS. 1 and 2 will be explained below in conjunction with FIGS. 3a and 3b. FIG. 3a shows a block circuit control diagram for the reception path, when the remote caller feeds the signal uf. The alternating-voltage signal uab is then present at the terminals a and b as a set-point signal. It is assumed that the alternating signal uab is impressed. A typical value of 10,000 is assumed for the gain V of the gain-controlled amplifier RV, and a typical value of 10 mS is assumed for the slope gmT of the control transistor T. A typical value between 100 and 1000, which is very much greater than the inverse of the product of the gain V and the slope gmT, results for the product of the current sensor resistor RS and the dimensionless transmission factor Ü of the impedance transmission network IMP. In FIG. 3a, the current iab then is determined from the quotient of uab and the product of RS and the transmission factor Ü. If the value of the line impedance is selected for this product, then the alternating current iab is the quotient of the alternating voltage signal uab and the termination impedance.

Figure 3B:
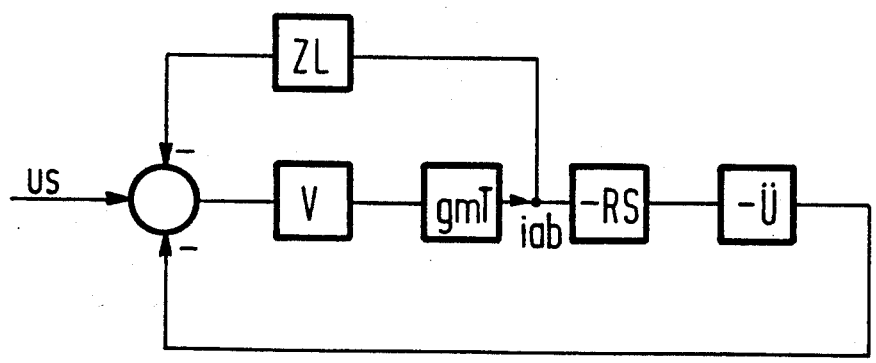
FIG. 3b is a basic closed-loop circuit diagram for transmission signal control.

FIG. 3b shows the alternating-signal control behavior of the configuration of FIGS. 1 and 2 when the transmission signal us is fed in as the set-point signal. On one hand, the current iab flowing through the control transistor T is carried through the line impedance ZL and on the other through the current sensor resistor RS and the transmission factor Ü of the impedance transmission network IMP to its subtractor, which compares the signals with the transmission signal and then corrects the control difference through the gain-controlled amplifier RV with the gain V and the control transistor T. Under the condition selected for FIG. 3a for the values of V, gmT, RS and Ü, where the product of RS and Ü is intended to be equal to the termination impedance, the result is that the current iab is equal to the quotient of the transmission signal us and the sum of the line impedance ZL and the terminal impedance RS·Ü. As a substitute circuit diagram for the configuration between the terminals a and b of FIG. 2, the result is a current source having the current us divided by the sum of the termination impedance and the line impedance. For the voltage of the signal uab at the terminals a and b, the result is the negative product of the transmission voltage signal us and the quotient of the line impedance ZL, referred to the sum of the line impedance ZL and the termination impedance. For limit situations, the following applies: In the no-load condition, the line impedance ZL equals infinity, and the current iab equals zero. The voltage signal uab is then equivalent to the negative transmission voltage signal us. The transmission voltage signal us is propagated backward along the line, because current is not flowing through any of the existing resistors. In the short-circuit limit situation, the line impedance ZL equals zero, and the voltage signal uab is also zero. The current iab is the result of the transmission voltage signal us and the termination impedance of the configuration. In the case of adaptation, the termination impedance between the terminals a, b is equal to the line impedance ZL. The voltage signal uab then equals minus one-half the transmission voltage.

An explanation of how a two-wire/four-wire conversion can be combined with the alternating-signal closed-loop control circuit of FIG. 2 will be given below in connection with FIG. 1. The adaptation transmission network NB and the other subtractor S4 in the circuitry which has already been described, are used for this purpose. The alternating-voltage signal uab occurring at the terminals a and b is the sum of the reception signal u'f and the other transmission signal u's. The voltage of the signal u's is the product of the transmission current is and the line impedance, and the transmission current "is" is a function of the transmission signal us and the line and termination impedance. The reception signal u's is the signal uf of the remote caller that is actually received at the terminals a and b.

The sum of the reception signal u'f and the signal u's formed from the transmission current "is" is thus present at the output of the subtractor S3. At the output of the adaptation transmission network NB, the signal u's is also obtained from the transmission signal us, which is weighted with the adaptation transmission function. This means that the connection between the signal u's and the transmission signal us must be simulated in the adaptation transmission network. The subtraction of the output signal of the subtractor S3 ideally furnishes the reception signal u'f to the reception terminal Ek. If there is a defective simulation of the signal u's, part of the transmission signal is then added to the reception signal at the reception terminal (sidetone-reference equivalent).

The quality of the closed-loop control described in conjunction with FIG. 2 can be tested with the aid of the configuration described above. If the transmission signal us is fed in, then upon adaptation, in other words whenever the termination impedance at the terminals a and b equals the line impedance ZL, the voltage at the terminals a, b equals the inverse of one-half the transmission voltage. If the adaptation transmission function of the network NB is then selected as a multiplication factor of $-\frac{1}{2}$, then ideally no voltage must be allowed to occur at the reception terminal Ek. In fact, a sidetone-reference equivalent of $-30$ dB or better can be attained.

A further advantageous feature of the line termination configuration of FIGS. 1 and 2 is the inclusion of a closed-loop direct-voltage characteristic curve control, which will be explained in conjunction with FIG. 4. The same elements are identified by the same reference numerals as in the previous figures.

The closed-loop direct-signal characteristic curve control is decoupled from the closed-loop alternating-signal control, so that the closed-loop control circuits do not affect one another. The direct-signal characteristic control can therefore be used even in configurations that do not have any alternating-signal control.

Figure 4:
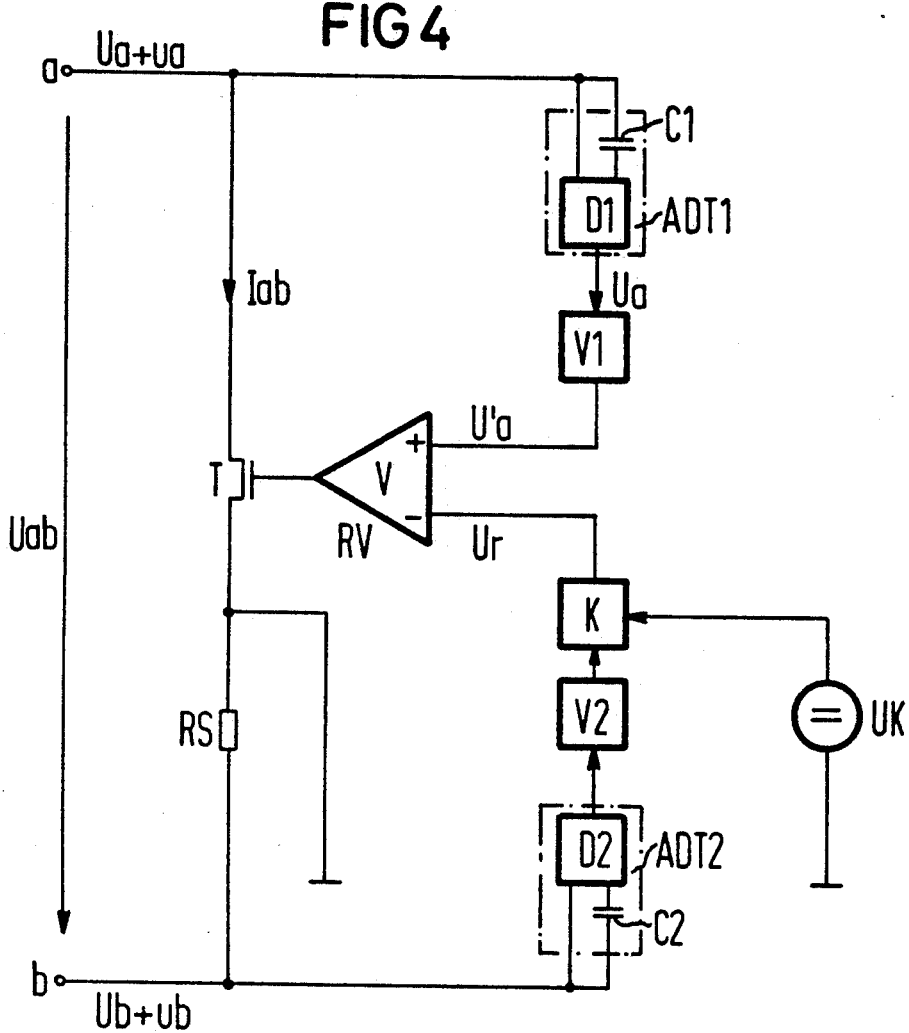
FIG. 4 is a basic circuit diagram of a direct-signal control with a predetermined characteristic curve.
Figure 5:
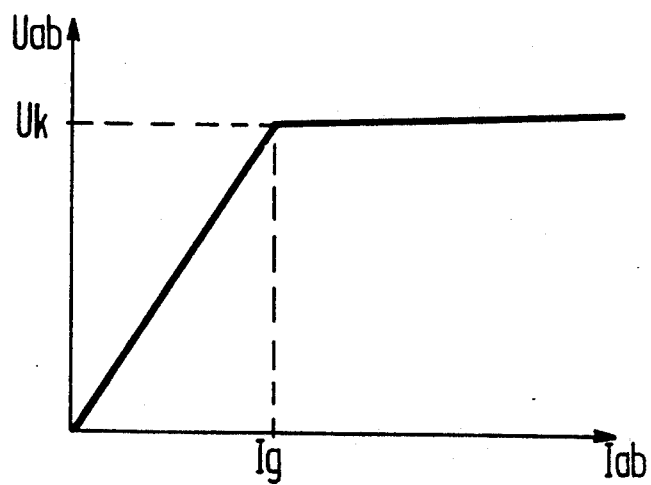
FIG. 5 is a graph for explaining the direct-signal characteristic curve.

A characteristic curve shown in FIG. 5 can be achieved with the configuration of FIG. 4. The direct voltage signal Uab between the terminals a and b rises linearly with the direct current Iab through the transistor T and the current sensor resistor RS, until the trip voltage Uk. The direct voltage is limited above a limit current Ig determined by the trip voltage Uk. In FIG. 4, the linear portion and the limited portion of the direct-signal characteristic curve are each provided by a separate closed-loop control circuit. Once the direct current Iab reaches the limit value Ig, then a switchover from one closed-loop control circuit to the other is made discontinuously, with the aid of the comparator K. The resultant trip in the direct-signal characteristic does not affect the alternating-signal control, since the two closed-loop control circuits are independent of one another.

In closed-loop control in the linear portion of the characteristic curve, the drain-to-source voltage of the control transistor T is regulated linearly upward with a rising current Iab. The direct voltage signal Uab is equal to the sum of the drain-to-source voltage and the product of the direct current Iab and the resistance of the current sensor resistor RS. On the other hand, the current Iab is equal to the difference between the drain-to-source voltage of the control transistor T and the reference voltage Ur at the output of the amplifier V2, which is multiplied by the gain V of the gain-controlled amplifier RV and the slope gmT of the control transistor T. In this case, the reference voltage Ur depends on the product of the current Iab, the resistance of the current sensor resistor RS, and the transmission factor of the amplifier V2. On the assumption that the inverse of the gain V and slope gmT is small as compared with the product of the resistance of the current sensor resistor RS and the transmission factor of the amplifier V2, the current Iab is equal to the quotient of the drain-to-source voltage of the transistor T and the product of the resistance of the current sensor resistor RS and the transmission factor of V2. If a non-inverting amplifier provided by a hard-wired operational amplifier is selected as the amplifier V2, then the gain can be adjusted through two resistors of the circuitry of the operational amplifier. Given a gain or transmission factor of the amplifier V2 of 18 and a current sensor resistance of 22 Ω, the voltage signal Uab is obtained as the product of the current Iab and a resistance of 440 Ω.

In the limited portion of the closed-loop control, the drain-to-source voltage of the transistor T is regulated to be constant. However, as dictated by the voltage drop at the current sensor resistor RS, the direct voltage at the terminals a and b rises with a small inclination, as FIG. 5 shows. The switchover to the trip voltage Uk is effected with the aid of the comparator K, so that then the reference voltage Ur is equal to the trip voltage Uk. On the assumption of a sufficiently high gain of the gain-controlled amplifier RV, the interference of the signal Uab and the influence of the current source of the transistor T are eliminated in the closed-loop control. The stationary accuracy can also be adjusted with the gain V. The result is then that the drain-to-source voltage of the control transistor T is equal to the trip voltage Uk.

Including the closed-loop control of FIG. 4 in the closed-loop control of FIG. 2 is effected by means of the adders S1 and S2. An important aspect for purposes of construction is that the direct voltage Ua in the amplifier V1 is multiplied by a factor that effects a level correction.

Figure 6:
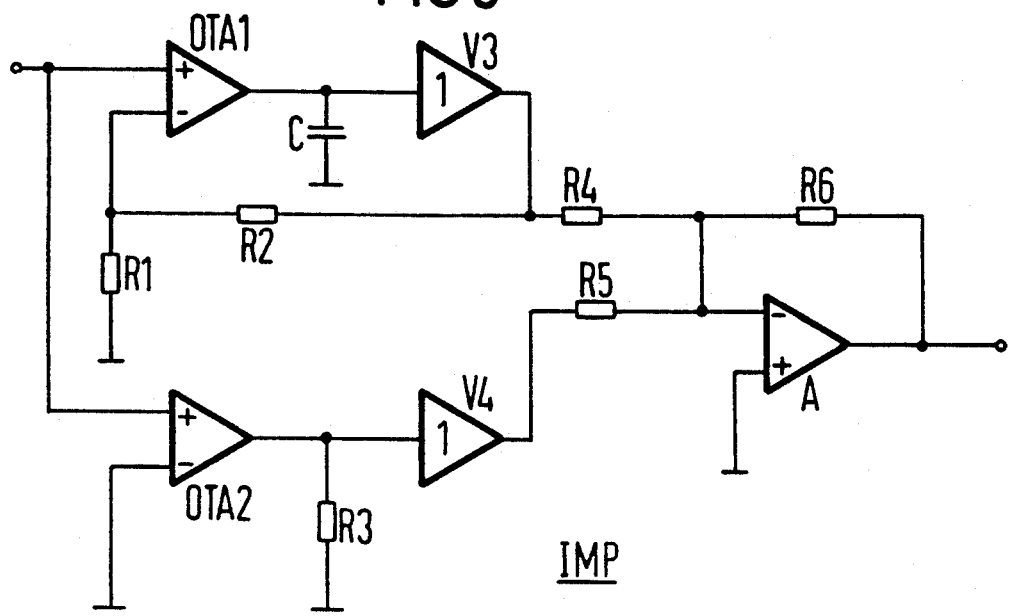
FIG. 6 is a basic circuit diagram of an electronic impedance transmission network.

FIG. 6 shows the basic circuit diagram of an exemplary embodiment of an impedance transmission network IMP. The network includes an active RC element having elements OTA1, V3, C, R1 and R2. Elements OTA2, V4 and R3 form a proportional element, and elements R4–R6 and A form an adder. Upon the calculation of the output signal at the element A referred to an input signal, the result is a complex transmission factor Ü. Accordingly, all of the elements of the configuration of FIG. 6, including the capacitor C, are integrable.

Figure 7:
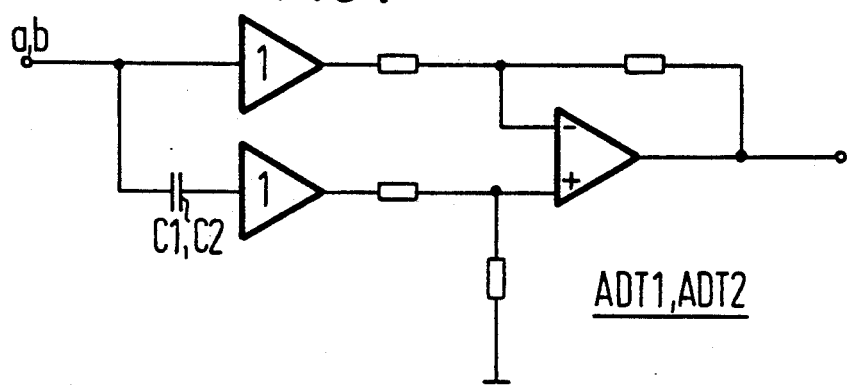
FIG. 7 is a basic circuit diagram of an electronic direct and alternating-signal separator.

FIG. 7 is a basic circuit diagram of an exemplary embodiment for separating direct and alternating signals using the function blocks ADT1 and ADT2. The terminals a and b are followed directly, and also indirectly through a decoupling capacitor C1, C2, by decoupling amplifiers. The output signals of the two amplifiers are subtracted from one another in a subtractor including resistors which are not shown in further detail, and the operational amplifier. The direct-voltage signals Ua and Ub are then present at the output of the operational amplifier which is not shown in further detail.

Figure 8:
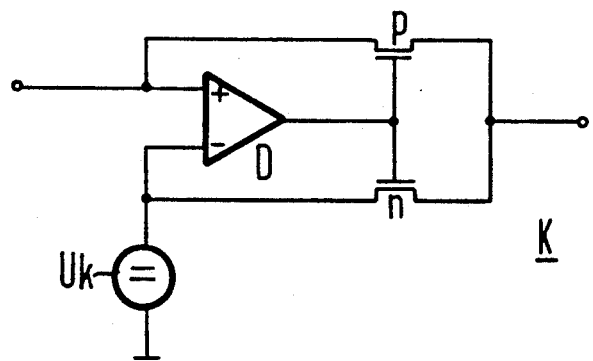
FIG. 8 is a basic circuit diagram of a comparator.

FIG. 8 shows the principle of an exemplary embodiment of a comparator K that includes a differential amplifier D and n or p-channel transistors being triggered on the output side. The output circuit of the n-channel transistor is connected between the output terminal of the comparator and the inverting input of the differential amplifier D. The output circuit of the p-channel transistor is connected between the output terminal of the comparator K and the non-inverting input of the differential amplifier D, which is also connected to the amplifier V2. The voltage source having the trip voltage Uk is also connected to the inverting input of the differential amplifier D.

Adaptation of the configuration according to the invention to various telephone lines with respect to the termination impedance is effected with the aid of the impedance transmission network IMP, for instance through the resistors R1–R6 and the capacitor C. The conformation of the adaptation transmission network NB is effected in accordance with the various line impedances or termination impedances, for instance with active elements as explained with regard to FIG. 6. Upon line adaptation, that is when the line impedance and the termination impedance are equal, the adaptation transmissin network has the real multiplication factor ½. Adaptation of the direct-voltage characteristic curve to various telephone lines can be performed with the aid of the direct voltage Uk or the gain of the amplifier V2, in other words with the adjusting elements of the direct-signal characteristic curve transmission network. The adjusting elements of the configuration according to the invention are suitably programmable.

We claim:

1. A method for forming a line termination at two line terminals of a telephone line, which comprises separating alternating signals form direct signals applied to line terminals, generating an alternating line signal from the alternating signals, the alternating line signal being referred to a reference variable, and adding the alternating line signal to a transmission signal from a transmission terminal to form a resultant actual-value signal; comparing the resultant actual-value signal with a reference signal at a gain-controlled amplifier, forming the reference signal as a function of an impedance transmission function and the alternating signal at one of the line terminals being connected to a current sensor resistor; determining a current between the line terminals with a control transistor associated with the current sensor resistor, and controlling the control transistor with the gain-controlled amplifier.

2. The method according to claim 1, which comprises comparing the alternating line signal with a signal formed as a function of the transmission signal with an adaptation transmission function resulting from the impedance ratio between the telephone line and a line termination.

3. The method according to claim 1, which comprises amplifying the direct signals of the line terminals being separated from the alternating signals to the actual-value signal, weighting the direct signals with a direct-signal characteristic curve transmission function, and adding the amplified and weighted direct signals to the reference signal.

4. The method according to claim 2, which comprises amplifying the direct signals of the line terminals being separated from the alternating signals to the actual-value signal, weighting the direct signals with a direct-signal characteristic curve transmission function, and adding the amplified and weighted direct signals to the reference signal.

5. A configuration for forming a line termination at two line terminals of a telephone line, comprising first and second means each being connected downstream of a respective one of the two line terminals for separating alternating signals from direct signals applied to the line terminals;

subtraction means connected to said separating means for referring both of the alternating signals to a reference variable, a transmission terminal for issuing a transmission signal, means connected to said subtraction means and to said transmission terminal for adding both of the alternating signals to the transmission signal and forming a resultant actual-value signal, a current sensor resistor connected to one of the line terminals, an impedance transmission network connected to one of the line terminals for forming a reference signal as a function of the alternating signal of the one of the line terminals, a gain-controlled amplifier having a first input connected to said adding means for receiving the resultant actual-value signal and a second input connected to said impedance transmission network for receiving the reference signal; and a control transistor being connected to said current sensor resistor between the two line terminals and having a control input connected to said gain-controlled amplifier.

6. The configuration according to claim 5, including an adaptation transmission network connected to said transmission terminal for forming another signal from the transmission signal, another subtractor having inputs and an output, the inputs of said other subtractor being connected to said adaptation transmission network and to said subtraction means for subtracting the other signal formed by said adaptation transmission network from the alternating line signal, and a reception terminal connected to the output of said other subtractor.

7. The configuration according to claim 6, wherein said adaptation transmission network achieves a constant transmission function of ½ if the impedances of the telephone line and of the configuration match.

8. The configuration according to claim 6, wherein said adding means are a first adder, and including means connected between said first separating means and said first adder for amplifying and adding direct signals separated from the alternating signals to the actual-value signal, a direct-signal characteristic curve transmission network connected to said second separating means for weighting direct signals, and a second adder connected between said direct-signal characteristic curve transmission network, said impedance transmission network and said gain-controlled amplifier for adding direct signals to the reference signal.

9. The configuration according to claim 8, wherein said direct-signal characteristic curve transmission network includes a comparator having an input side, a direct-signal source connected to the input side of said comparator, and an amplifier connected between the input side of said comparator and said second separating means.

10. The configuration according to claim 8, wherein said impedance transmission network, said adaptation transmission network and said direct-signal characteristic curve transmission network have adjustable elements determining transmission functions.

11. The configuration according to claim 5, wherein the configuration is at least partly constructed as an integrated circuit with active elements.

* * * * *